Patented July 28, 1931

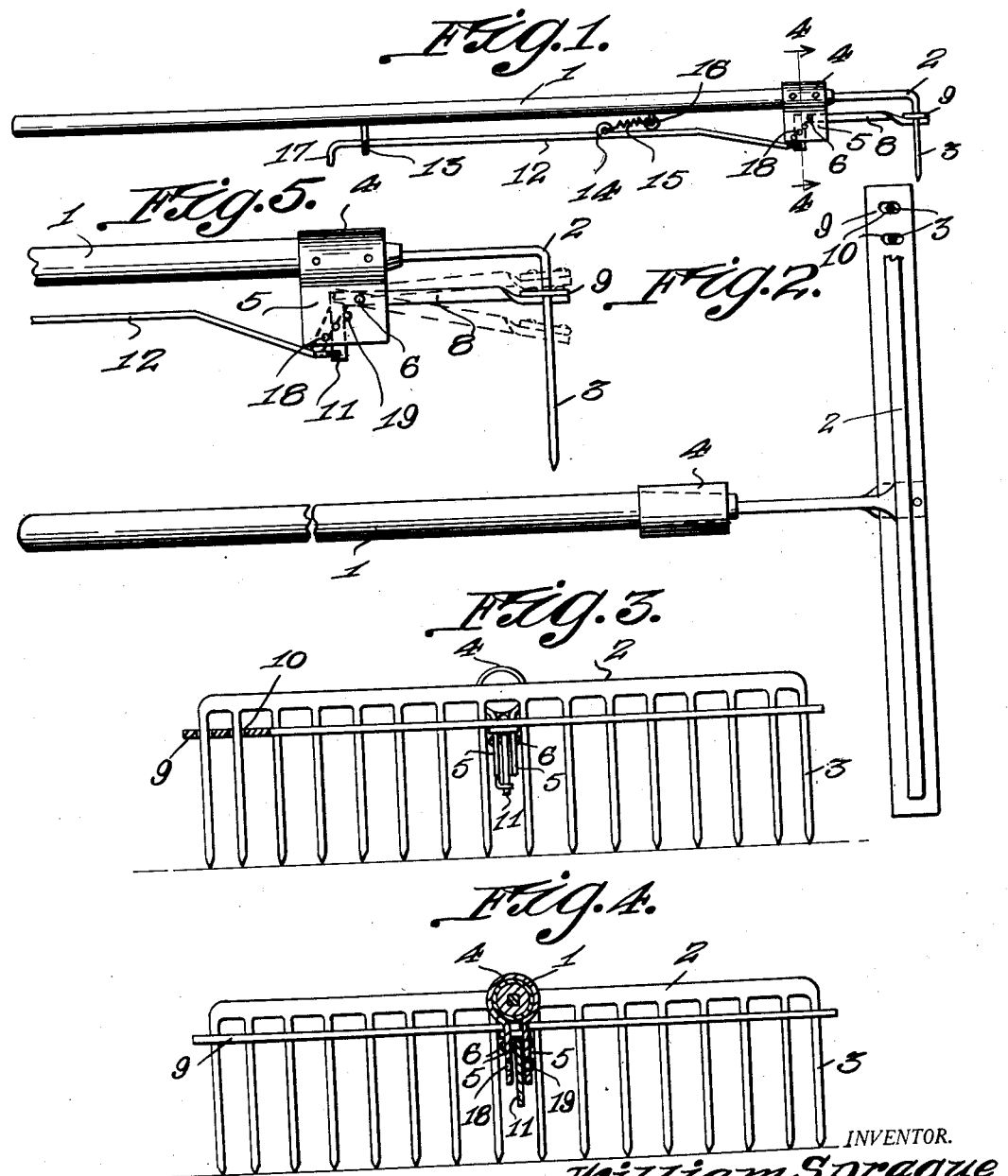

1,816,703

UNITED STATES PATENT OFFICE

WILLIAM SPRAGUE, OF MONTICELLO, ILLINOIS

COMBINED RAKE CLEANER AND DEPTH GAUGE

Application filed July 30, 1929. Serial No. 382,185.

The object of this, my present invention is the provision of a combined rake cleaner and depth gauge, in which the cleaning or stripping element may be operated to sweep over the teeth of the rake to clean the foliage from between the teeth of the rake, which when released will be automatically returned to initial position and which is so constructed and mounted that the same may be held at any desired position with respect to the length of the rake teeth, so that the said plate will thus serve as a gauge plate for the teeth, so that the teeth can only enter the ground for desired depths when raking garden seeds and soil.

A still further object is the provision of a device for this purpose that can be cheaply constructed of stamped sheet metal, may be easily and quickly attached to a garden rake having either straight or curved teeth and which will perform its functions with accuracy and efficiency.

To the attainment of the foregoing the invention consists in the improvement hereinafter described and definitely claimed.

In the drawings:

Figure 1 is a side elevation of a garden rake having my improvement in applied position thereon.

Figure 2 is a top plan view thereof, a portion of the head of the rake being broken away and the teeth in section.

Figure 3 is a front elevation thereof with a portion of the combined stripping and gauge plate.

Figure 4 is a sectional view on the line 4—4 of Figure 1.

Figure 5 is an enlarged fragmentary side elevation to illustrate the various positions of the combined stripping and gauge plate with respect to the teeth of the rake.

In the drawings the numeral 1 designates a rake handle, 2 the head plate of the rake from which extends the teeth 3. While in the showing of the drawings the teeth 3 are straight they may be curved if desired.

My improvement includes a sleeve 4 which is fixedly secured to the handle adjacent to its connection with the shank of the rake head. The sleeve is formed with extending spaced sides 5, and between these sides there is pivoted, as at 6, an outwardly extending arm 8. The arm is given a half twist adjacent to its outer end and fixed on this twisted portion there is the combined stripping and gauge plate 9. The gauge plate is formed with spaced transverse somewhat elongated openings 10 for the reception of the teeth 3 of the rake therethrough and by reference to the drawings it will be noted that the plate 9 is considerably wider than the head of the rake. The arm 8 has an inner extension 11 disposed at an angle to the arm 8 and this extension is disposed inwardly with respect to the pivot 6. There is loosely secured to the end of the extension 11 one end of a rod 12. This rod is guided through a suitable eye 13 that is fixed on the under face of the handle 1. The rod is formed with an eye portion 14 to which is secured one end of a helical spring 15. The second end of the spring is fixed to a screw eye 16 that is let in the under face of the handle 1. The free end of the rod 12 is bent to form the same with a handle 17 which is conveniently located with respect to the operator of the rake. It will be apparent that a pull upon the handle end of the rod will cause the angle arms to be swung upon their pivot 6 so that the plate 9 will be brought over the teeth 3 of the rake and strip the said rake from any accumulation of foliage between the teeth thereof. It will also be apparent that upon a release of the handle 17 the spring 15 will turn the plate 9 to its initial position.

The side members 5 of the sleeve 4 are provided with arcuately arranged series of alining openings 18 and through any one of these openings there may be passed a pin 19 which contacts with the outer edge of the extension end 11 of the arm 8 which locks the said rod at any desired angle as disclosed by the full and by the dotted lines in Figure 5 of the drawings and consequently holds the plate 9 adjusted on the teeth of the rake. When in this position the plate 9 serves as a depth gauge preventing the teeth of the rake entering the ground or foliage beyond a predetermined depth.

The simplicity of the invention and the advantages thereof will, it is thought, be apparent without further detailed description.

Having described the invention, I claim:

A combined rake cleaner and depth gauge comprising a sleeve mounted on the handle of the rake and having spaced parallel portions, an arm having one end pivoted between said portions of the sleeve, a cleaning and gauge plate carried by the arm and slidable on the teeth of the rake, an extension formed on the pivoted end of the arm and disposed at right angles thereto and located between said parallel portions of the sleeve, an operating means connected to said extension, said parallel portions of the sleeve having a plurality of arcuately arranged openings and the openings in one portion aligning with the openings in the other portion, and a pin to be positioned in any one pair of aligned openings and engaging the extension to hold the plate at any desired position on the teeth of the rake.

In testimony whereof I affix my signature.

WILLIAM SPRAGUE.